(12) United States Patent
Nakajima et al.

(10) Patent No.: US 7,826,690 B2
(45) Date of Patent: Nov. 2, 2010

(54) WAVEGUIDE TYPE OPTICAL ISOLATOR AND MAGNET HOLDER USED IN WAVEGUIDE TYPE OPTICAL ISOLATOR

(75) Inventors: Ikuo Nakajima, Kanagawa (JP); Etsuji Hayakawa, Kanagawa (JP); Tetsuya Mizumoto, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 12/279,527

(22) PCT Filed: Feb. 16, 2007

(86) PCT No.: PCT/JP2007/053330

§ 371 (c)(1),
(2), (4) Date: Sep. 23, 2008

(87) PCT Pub. No.: WO2007/094515

PCT Pub. Date: Aug. 23, 2007

(65) Prior Publication Data
US 2009/0208165 A1 Aug. 20, 2009

(30) Foreign Application Priority Data
Feb. 17, 2006 (JP) .............................. 2006-041164

(51) Int. Cl.
*G02F 1/295* (2006.01)
*G02B 6/36* (2006.01)
(52) U.S. Cl. ............................................. 385/6; 385/92
(58) Field of Classification Search .................... 385/6, 385/92
See application file for complete search history.

(56) References Cited

U.S. PATENT DOCUMENTS

| | | | | |
|---|---|---|---|---|
| 3,748,605 A * | 7/1973 | Baynham et al. | ............. | 333/209 |
| 4,978,189 A * | 12/1990 | Blonder et al. | ................ | 385/35 |
| 5,022,977 A * | 6/1991 | Matsuoka et al. | ....... | 204/298.16 |
| 5,031,983 A * | 7/1991 | Dillon et al. | ................... | 385/11 |
| 5,466,295 A * | 11/1995 | Getty | .................. | 118/723 MA |
| 5,598,492 A * | 1/1997 | Hammer | ....................... | 385/27 |
| 5,714,009 A * | 2/1998 | Boling | ............... | 118/723 MW |
| 6,108,470 A * | 8/2000 | Jin et al. | ....................... | 385/37 |
| 6,141,470 A * | 10/2000 | Espindola et al. | ............. | 385/37 |
| 6,270,261 B1 * | 8/2001 | Kawano | ....................... | 385/88 |
| 6,741,782 B2 * | 5/2004 | Berini | ......................... | 385/130 |

(Continued)

FOREIGN PATENT DOCUMENTS

JP           08-050261 A        2/1996

(Continued)

OTHER PUBLICATIONS

English Language International Search Report dated Mar. 20, 2007 issued in parent Appln. No. PCT/JP2007/053330.

*Primary Examiner*—K. Cyrus Kianni
(74) *Attorney, Agent, or Firm*—Holtz, Holtz, Goodman & Chick, PC

(57) ABSTRACT

A waveguide type optical isolator comprises a substrate, a waveguiding layer provided with waveguides, a magnetic garnet, magnetic field applying means, and a package substrate, wherein a first magnet and a second magnet is provided as the magnetic field applying means, and the first magnet and the second magnet are housed and fixed within a magnet holder.

8 Claims, 5 Drawing Sheets

U.S. PATENT DOCUMENTS

| | | | |
|---|---|---|---|
| 6,952,300 B2* | 10/2005 | Levy | 359/280 |
| 7,260,281 B2* | 8/2007 | Salib et al. | 385/11 |
| 7,260,282 B2* | 8/2007 | Salib et al. | 385/11 |
| 7,343,057 B2* | 3/2008 | Salib et al. | 385/11 |
| 2002/0131667 A1* | 9/2002 | Berini | 385/11 |
| 2003/0059147 A1* | 3/2003 | Berini | 385/2 |
| 2003/0147579 A1* | 8/2003 | Hammer | 385/11 |
| 2003/0224214 A1* | 12/2003 | Garito et al. | 428/694 ML |
| 2004/0179256 A1* | 9/2004 | Hammer | 359/248 |
| 2005/0213864 A1* | 9/2005 | Ellwood | 385/6 |
| 2006/0222283 A1* | 10/2006 | Salib et al. | 385/11 |
| 2006/0289113 A1* | 12/2006 | Cura et al. | 156/272.4 |
| 2007/0230858 A1* | 10/2007 | Salib et al. | 385/11 |

FOREIGN PATENT DOCUMENTS

| | | |
|---|---|---|
| JP | 2000-028865 A | 1/2000 |
| JP | 2001-350039 A | 12/2001 |
| JP | 2002-277826 A | 9/2002 |

* cited by examiner (a) Forward Propogating Wave (In-Phase Interference)
Phase Difference = π/2 (Optical Path Difference) - π/2 (Non-Reciprocal) = 0

(b) Backward Propogating Wave (Out-of-Phase Interference)
Phase Difference = π/2 (Optical Path Difference) + π/2 (Non-Reciprocal) = π

US 7,826,690 B2

WAVEGUIDE TYPE OPTICAL ISOLATOR AND MAGNET HOLDER USED IN WAVEGUIDE TYPE OPTICAL ISOLATOR

This application is a U.S. National Phase Application under 35 USC 371 of International Application PCT/JP2007/053330 filed Feb. 16, 2007.

TECHNICAL FIELD

The present invention relates to a waveguide type optical isolator and a magnet holder used in such an isolator, and more particularly, relates to a waveguide type optical isolator and a magnet holder used in the waveguide type optical isolator which can improve the population accuracy of the magnets being used as magnetic field applying means and also fix the magnets over a long period of time.

BACKGROUND TECHNOLOGY

An optical isolator is an element which allows light to transmit only in one direction but prevents the light from propagating in a opposite direction thereto. For example, by arranging the optical isolator at an emitting end of a semiconductor laser, the light emitted from the semiconductor laser transmits through the optical isolator, and it is possible to be used this light as a light source for optical fiber communications. Conversely, the light which is going to be incident on the semiconductor laser through the optical isolator prevents by the optical isolator, so that the light cannot be incident on the semiconductor laser. Unless the optical isolator is placed at the emitting end of the semiconductor laser, a reflected return light will be incident on the semiconductor laser, and thereby a degradation of oscillation characteristics of the semiconductor laser is caused. Namely, the optical isolator serves to block the light which is going to be incident on the semiconductor laser, and to maintain a stable oscillation without degrading the characteristics of the semiconductor laser.

In optical active elements such as not only the aforementioned semiconductor laser but also an optical amplifier or the like, operating characteristics of the element are degraded by unintentional incidence of light from an opposite direction. Since the optical isolator allows the light to transmit only in one direction, it is possible to prevent the unintentional incidence of light to the optical active element from the opposite direction.

In an area which the light transmits, a structure having no wave-guiding action in which the light is confined within a cross sectional area perpendicular to the propagation direction of the light (the bulk type) and a structure having a wave-guiding action (the waveguide type) are exist in the optical isolator. In recent years, there has been a pressing need to downsize both the optical isolator of the bulk type and the optical isolator of the waveguide type, and thereby it is also need to downsize each component.

For example, as shown in Japanese Published Patent Application No. 2002-277826, and as shown in FIG. 1 with the schematic cross-sectional view, a waveguide type optical isolator 100 is constituted by providing a substrate 101, a waveguiding layer 103 formed with a waveguide 102, a magnetic garnet 104, and magnetic field applying means having a permanent magnet 105. And as shown in the figure, the waveguide type optical isolator 100 has waveguides 102A and 102B, and permanent magnets 105A and 105B corresponding to the waveguides 102A and 102B. A magnetic field is provided to the light passing through the waveguides by the permanent magnets 105A and 105B. In order to provide an appropriate phase variation to the light, it is required to populate the permanent magnets 105A and 105B at appropriate positions on the magnetic garnet 104 so that the mounted distance between the permanent magnets 105A and 105B is made an appropriate distance.

However, as the waveguide type optical isolator 100 is downsized, the permanent magnet 105 is also downsized. Therefore, it is very difficult to populate the permanent magnet 105 at an appropriate position on the magnetic garnet 104, and thereby population accuracy of the magnet is extremely low.

Moreover, in the waveguide type optical isolator 100, the permanent magnet 105 is fixed on the magnetic garnet 104 by adhesive. Therefore, since it becomes a state which a mutual stress of the permanent magnet 105 act at all times, for example, the problem occurs that the permanent magnet 105 separate from on the magnetic garnet 104, consequently, the structure of the waveguide type optical isolator remains uncertainty with respect to fix the permanent magnet 105 over a long period of time.

FIG. 2 shows an operating principle of the waveguiding type optical isolator. The waveguiding type optical isolator is set so that light waves which propagate in optical waveguides 102A and 102B may be in phase to propagating waves of forward direction (forward propagating waves) and may be in opposite phases to propagating waves of backward direction which propagate in opposite directions (backward propagating waves), by utilizing a phase variation whose magnitude is different depending on a propagation direction generated in optical waveguides 102A and 102B constituting an optical interferometer (hereinafter, referred to as "non-reciprocal phase shifting effect") (FIG. 2(a)).

In a case where two light waves are in phase, the light waves which launched from a central input end 107 is output from a central output end 109 in a branch coupler 108 (in the example of the figure, it is used a tapered branch coupler) provided on the output side (on the right-hand side in the figure) based on the symmetry of the structure (FIG. 2(b)).

Meanwhile, in a case where two light waves are in opposite phases, from the symmetry of the structure, since an antisymmetric distribution is formed in a branch coupler 108 provided on the input side (in the left-hand side in the figure), the light waves launched from central output end 109 are not output from the central output end 107 but are output from waveguides 102A and 102B which is undesired light output ends provided on both sides of the central output end 107 (FIG. 2 (c)).

Namely, the light wave launched from the central input end 107 of the branch coupler 108 on the left-hand side in the figure is output from the central output end 109 of the branch coupler 108 on the right-hand side in the figure. Conversely, the light wave launched from the central output end 109 of the branch coupler 108 on the right-hand side in the figure is output from the waveguides 102A and 102B on the right-hand side in the figure without entering to the central input end 107 of the branch coupler on the left-hand side in the figure. As described above, by utilizing the phase difference between ordinary light and extraordinary light, it is possible to isolate a propagation light of the opposite direction launched from the central output end 109 of the branch coupler 108 on the right-hand side in the figure.

In order to achieve an operation of a branching and coupling characteristic of such a light of the optical isolator, a constant amount of non-reciprocal phase shifting effect is required. First of all, one of the interfering optical paths is made longer than the other one, and thereby a phase difference independent of the propagating direction between the two optical paths (reciprocal phase difference) is generated. And the non-reciprocal phase shifting effect can be generated by arranging a magneto-optical material (material which has a magneto-optical effect) in a planar waveguide, externally applying a magnetic field in a direction perpendicular to a propagation direction (transverse direction) in a waveguide plane, and orienting magnetization of the magneto-optical material. Since the non-reciprocal phase shifting effect due to magneto-optical effect is determined by the relation between the propagation direction of the light and an orientation direction of the magnetization, the non-reciprocal phase shifting effect becomes different in a case where the propagation direction is reversed while keeping a magnetizing direction.

Since the magnetic fields are applied in an antiparallel to each other to waveguides 102A and 102B constituting the interferometer in the waveguide type optical isolator shown in FIG. 2, a phase difference of the light waves when each light waves propagate the same distance in waveguides 102A and 102B corresponds to an amount of non-reciprocal phase shifting (difference of the phase variation between the forward propagating wave and the backward propagating wave). Additionally, if a phase difference of $+\phi$ occurs between two waveguides due to the non-reciprocal phase shifting effect to the forward propagating wave, a phase difference of $-\phi$ which is an opposite sign to that will occur to the backward propagating wave.

Here, an optical path length difference corresponding to ¼ wavelength is provided in two waveguides constituting the interferometer. It is intended that the light which propagates through a waveguide with longer optical path gives a phase variation which is larger only $\pi/2$ regardless of the direction. Namely, if the waveguide with longer optical path is made to generate a phase difference due to the non-reciprocal phase shifting effect (hereinafter, referred to as "non-reciprocal phase shifting phase difference") of $-\pi/2$ as compared with a waveguide with shorter optical path to the forward propagating wave, the light waves which propagate through two waveguides are in phase to the forward propagating wave. At this time, since the sign of the non-reciprocal phase shifting phase difference is reversed when the propagation direction is reversed, the non-reciprocal phase shifting phase difference of $+\pi/2$ is given to the waveguide with longer optical path. This phase difference and the phase difference of $+\pi/2$ due to the optical path length difference are added, so that the light will input into the branch coupler in the state of an opposite phase (phase difference $\pi$). From the discussion described above, it can be concluded that the non-reciprocal phase shifting phase difference of $\pi/2$ is required in the waveguide type optical isolator shown in FIG. 2.

DISCLOSURE OF THE INVENTION

The present invention is made in view of the aforementioned problems. Therefore, an object of the present invention is to provide a waveguide type optical isolator which can improve the population accuracy of magnets which is a magnetic field applying means, additionally, can fix the magnet over a long period of time, and to provide a magnet holder used in the waveguide type optical isolator.

The aforementioned object of the present invention is achieved by providing a waveguide type optical isolator including a substrate, a waveguiding layer, a magnetic garnet, a magnetic field applying means, and a package substrate, wherein a waveguide is formed in the waveguiding layer, the magnetic field applying means includes a first magnet and a second magnet, and the first magnet and the second magnet are housed and fixed within a magnet holder.

Further, the aforementioned object of the present invention is effectively achieved by the waveguide type optical isolator, wherein the magnet holder comprises a base portion and at least three protruded portions of a first protruded portion extend from the base portion, a second protruded portion extend from the base portion, and a third protruded portion extend from the base portion, and a first housing portion is formed with the base portion, the first protruded portion, and the second protruded portion, and a second housing portion is formed with the base portion, the second protruded portion, and the third protruded portion, and the first magnet is housed and fixed within the first housing portion, moreover, the second magnet is housed and fixed within the second housing portion.

Further, the aforementioned object of the present invention is more effectively achieved by providing the waveguide type optical isolator, wherein a width of the second protruded portion is equal to a mounted distance between the first magnet and the second magnet on the magnetic garnet.

Further, the aforementioned object of the present invention is more effectively achieved by a waveguide type optical isolator, wherein the base portion of the magnet holder is made upper side, and the magnet holder is provided on the magnetic garnet.

Further, the aforementioned object of the present invention is more effectively achieved by a waveguide type optical isolator, wherein the first protruded portion and the third protruded portion extend up to upper surface of the package substrate, and the substrate, the waveguiding layer, the magnetic garnet, and the magnetic field applying means are housed within the magnet holder.

Further, the aforementioned object of the present invention is more effectively achieved by a waveguide type optical isolator, wherein the base portion of the magnet holder is made underside, and the magnetic garnet, the waveguiding layer, and the substrate are provided on the upper surface of the magnet holder in this order, and the magnet holder is used as the package substrate.

Furthermore, the above-described object of the present invention is more effectively achieved by providing a magnet holder used in said waveguide type optical isolator.

EFFECTS OF THE INVENTION

According to the waveguide type optical isolator of the present invention, the small permanent magnets constituting the magnetic field applying means are used by housing and fixing in the magnet holder, and thereby it is possible to populate the magnets at appropriate positions on the magnetic garnet with the high accuracy.

Further, since the mounted distance between the two magnets is fixed by the second protruded portion of the magnet holder, it is possible to prevent the magnets from separating from the magnetic garnet by the repulsive stress or the like between the magnets. Therefore, it is possible to fix the magnet over a long period of time.

Furthermore, since the side portions of the first protruded portion and the third protruded portion of the magnet holder extend up to the upper surface of the package substrate, in addition, the substrate, the waveguiding layer (the waveguides), the magnetic garnet, and the magnetic field applying means are be housed and fixed within the magnet holder, and thereby it is possible to fix the magnets over a long period of time, in addition, to guarantee the long-term reliability of the entire waveguide type optical isolator.

DESCRIPTION OF THE PREFERRED EMBODIMENTS

Hereinafter, a waveguide type optical isolator according to the present invention and a magnet holder used in the waveguide type optical isolator according to the present invention will be described with reference to the drawings.

Figure 1:
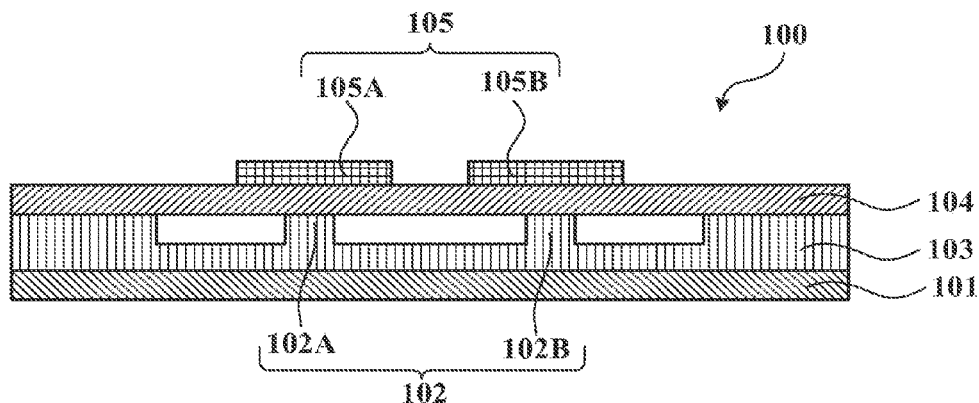
FIG. 1 is a schematic cross-sectional view of a conventional waveguide type optical isolator.
Figure 2:
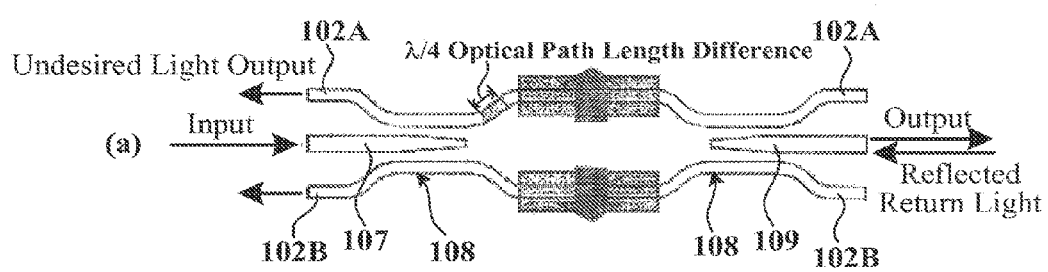
FIG. 2 is a schematic illustration view of the operating principle of a waveguide type optical isolator.
Figure 2:
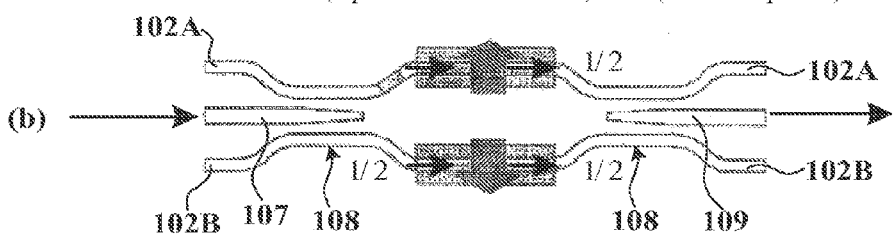
Figure 2:
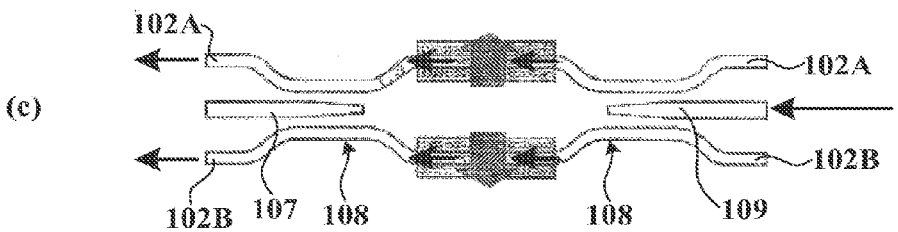
Figure 3:
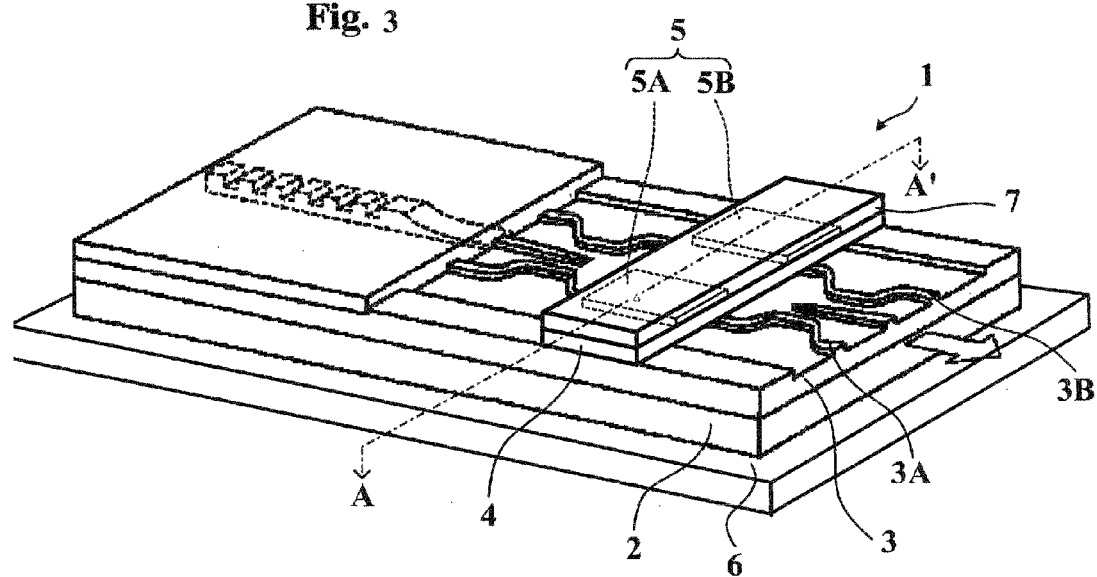
FIG. 3 is a perspective view showing one example of the waveguide type optical isolator according to the present invention.
Figure 4:
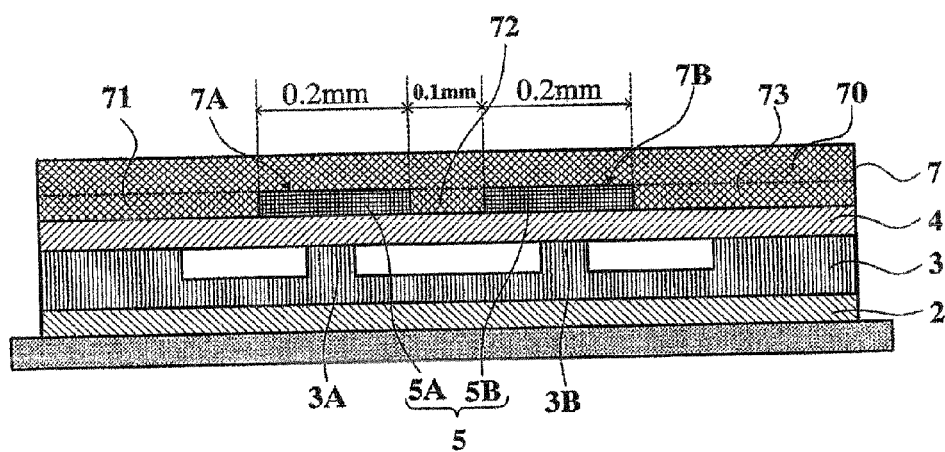
FIG. 4 is a cross-sectional view of A-A' in FIG. 3.

FIG. 3 is a perspective view of a waveguide type optical isolator according to the present invention, and FIG. 4 is a cross-sectional view of A-A' in FIG. 3.

As shown in the figures, the waveguide type optical isolator 1 comprises a substrate 2, a waveguiding layer 3, a magnetic garnet 4, and magnetic field applying means 5, and they are set on a package substrate (support substrate) 6. And two waveguides 3A and 3B are formed in the waveguiding layer 3. Namely, the waveguide type optical isolator 1 is constituted by providing the waveguiding layer 3 which is formed on the substrate 2 which is a compound semiconductor substrate (an InP substrate in the present embodiment) using a semiconductor material so as to be lattice-matched to the substrate 2, and in which two waveguides (that is, a first waveguide 3A and a second waveguide 3B) are formed, and further, by providing the magnetic garnet 4 composed of a magneto-optical material on the waveguiding layer 3, and furthermore, by providing the magnetic field applying means 5 for completing magnetization of the magneto-optical material in a predetermined direction on the magnetic garnet 4.

In the present embodiment, as shown in the figures, a first magnet 5A and a second magnet 5B are provided as the magnetic field applying means 5, and both of magnets 5A and 5B are small permanent magnets, further, the two magnets 5A and 5B are arranged so that the homopolarities may face to each other. Furthermore, the first magnet 5A is arranged on the magnetic garnet 4 so that the position of the central point in the width direction of the waveguide type optical isolator 1 coincides with the position of the central point of the first waveguide 3A. Incidentally, the second magnet 5B is arranged in the same way.

Figure 5:
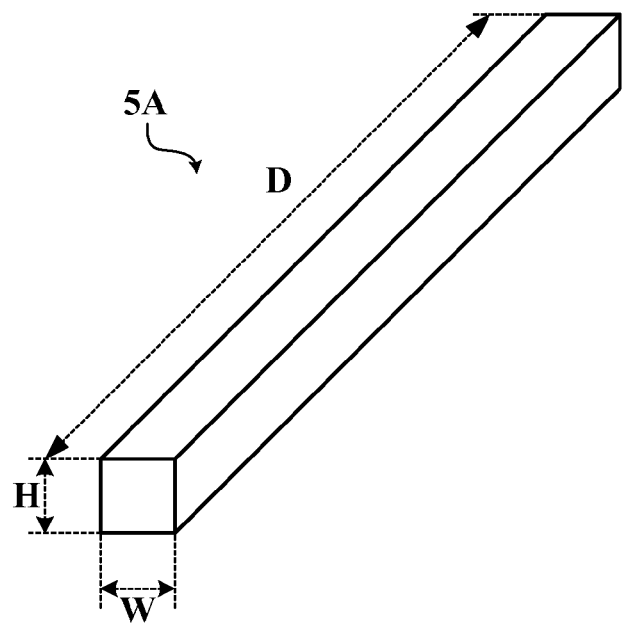
FIG. 5 is a schematic perspective view of the magnet used in the present invention.

A cast magnet (Fe—Al—Ni), which is capable of downsizing in accordance with the downsizing of the waveguide type optical isolator 1 and has excellent processability, is preferably used as the magnets 5A and 5B. Namely, as shown in FIG. 5 with a perspective view of the magnet 5A, as one example, the magnet of a rod-shaped rectangular parallelepiped of size of 0.2 mm (W)×0.3 mm (H)×6 mm (D) is available for the magnet 5A.

Incidentally, the size of the magnets 5A and 5B are one example. Therefore, the size of the magnets is not limited to such as a size, and further, it is also not limited to the cast magnet (Fe—Al—Ni). In other words, any type of magnet can be used, so long as it is possible to achieve downsizing of the waveguide type optical isolator 1, and to form a sufficient magnetic field, and further, to perform the role as the magnetic field applying means 5.

In the present invention, the first magnet 5A and the second magnet 5B are housed and fixed within a magnet holder 7, and they are provided on the magnetic garnet 4.

Figure 6:
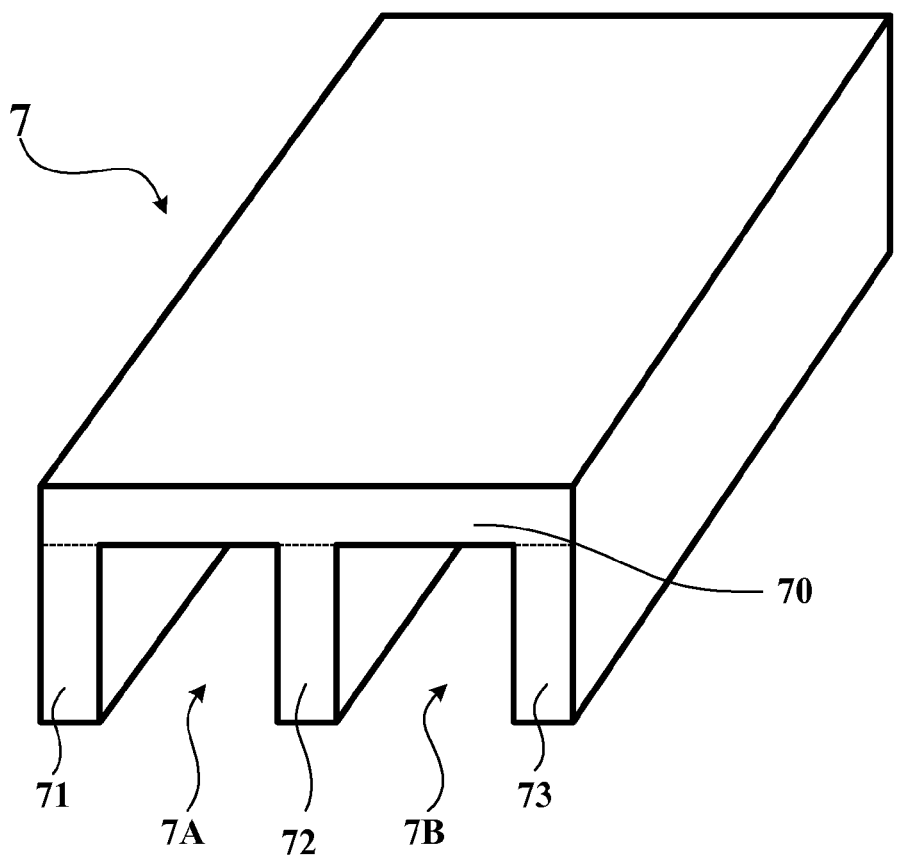
FIG. 6 is a perspective view showing one example of the magnet holder.

FIG. 6 shows a schematic enlarged perspective view of the magnet holder 7. As shown in the figure, the magnet holder 7 provides a base portion 70, a first protruded portion 71 extend from the base portion 70, a second protruded portion 72 extend from the base portion 70, and a third protruded portion 73 extend from the base portion 70. And the magnet holder 7 is constituted so as to be a long structure with a nearly E-shaped in cross-sectional shape.

In the magnet holder 7, a first housing portion 7A is formed with the base portion 70, the first protruded portion 71, and the second protruded portion 72, further, a second housing portion 7B is formed with the base portion 70, the second protruded portion 72, and the third protruded portion 73. Incidentally, in the present embodiment, the width of the first housing portion and the second housing portion are set to be 0.2 mm which is the width of the magnet. However, the width of the first housing portion 7A and the second housing portion 7B can be changed arbitrarily depending on the magnets used.

The first magnet 5A is inserted through and housed within the first housing portion 7A, and is fixed to the first housing portion 7A by adhesive or the like. And the second magnet 5B is inserted through and housed within the second housing portion 7B, and is fixed to the second housing portion 7B by adhesive or the like.

By using the magnets 5A and 5B housed and fixed within the magnet holder 7 in this manner, the magnets 5A and 5B can be mounted at appropriate positions on the magnetic garnet 4 with high accuracy.

And the second protruded portion 72 is a means for segregating the first housing portion 7A and the second housing portion 7B, in addition, is also a means for fixing the mounted distance between the first magnet 5A and the second magnet 5B. Therefore, the width of the protruded portion 72 is length equal to the mounted distance between the first magnet 5A and the second magnet 5B, and the width of the protruded portion 72 is set so as to be 0.1 mm in the present embodiment.

Namely, since it is necessary to apply the antiparallel magnetic fields to the waveguides 3A and 3B portions corresponding to just below the magnetic garnet 4, an interval between the waveguides 3A and 3B needs to be set to 0.3 mm. Additionally, in the present embodiment, as described above, the width (W) of the magnets 5A and 5B is 0.2 mm. Therefore, since the mounted distance between the first magnet 5A and the second magnet 5B is 0.1 mm, the width of the second protruded portion 72 of the magnet holder 7 is also 0.1 mm. Incidentally, the width of the magnet holder 7 can be set arbitrarily by adjusting the width (thickness) of the first protruded portion 71 and the third protruded portion 73. However, as described above, since the each width of the housing portions 7A and 7B (the magnets 5A and 5B) is 0.2 mm, and the width of the second protruded portion 72 is 0.1 mm, thereby the length from the inner wall of the first protruded portion 71 to the inner wall of the third protruded portion 73 is 0.5 mm.

Additionally, in the present embodiment, the height of the second protruded portion is set to be 0.3 mm which is the same height as the height (H) of the magnets 5A and 5B. However, in the waveguide type optical isolator 1, any one of the pointed end surfaces of the three protruded portions 71 to 73 have only to be in contact with the upper surface of the magnetic garnet 4. In other words, at least one of the pointed end of the three protruded portions 71 to 73 together with the magnets 5A and 5B have only to be bonded and fixed to the magnetic garnet 4 by adhesive or the like. Therefore, if at least any one of the protruded portions 71 to 73 has the height (H) of the magnets 5A and 5B, the height of the second protruded portion 72 may be lower than the height (H) of the magnets 5A and 5B.

Furthermore, since it is possible to eliminate the influence of the repulsive stress or the like of the magnets 5A and 5B by the strength of the second protruded portion 72, and thereby it is possible to hold stably the first magnet 5A and the second magnet 5B. Therefore, it is possible to prevent the first magnet 5A and the second magnet 5B from separating from the magnetic garnet 4, consequently, it is possible to fix the magnets 5A and 5B over a long period of time.

Incidentally, in the present embodiment, a stainless material is used as the material for the magnet holder 7, however, it is not limited such a material. Namely, any material can be used, so long as it is possible to house and fix the magnets 5A and 5B, and it does not affect the magnetic fields. However, considering processing accuracy, a nonmagnetic superalloy material is most preferable.

Additionally, the magnet holder 7 can be easily manufactured so that cross-sectional shape is made a nearly E-shaped by processing a long shaped stainless material using a processing method such as wire electro discharge processing, fine laser processing or the like.

The magnet holder 7 is arranged on the upper surface of the magnetic garnet 4 with the base portion 70 is made upper side, and is bonded and fixed thereto. Namely, resin adhesive of epoxy resin, silicone resin, or the like is coated on the upper surface of the magnetic garnet 4, and the magnet holder 7 is arranged, bonded and fixed so that the pointed end surfaces of the protruded portions 71 to 73 and the first magnet 5A and the second magnet 5B are in contact with the resin adhesive.

Figure 7:
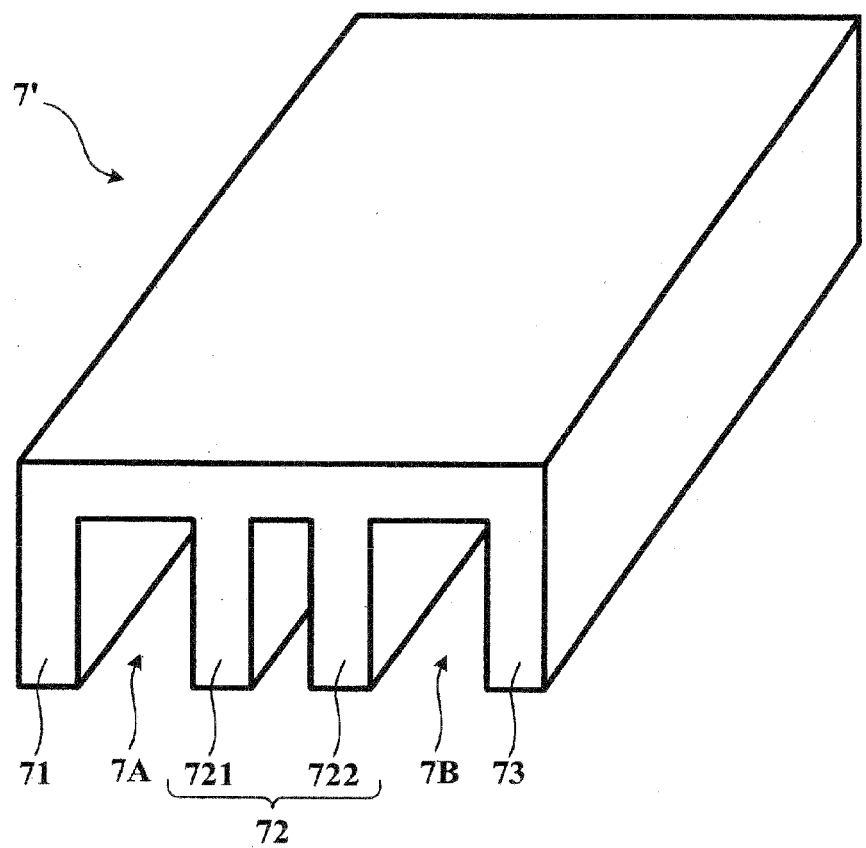
FIG. 7 is a perspective view showing an alternative example of the magnet holder.

FIG. 7 shows an alternative example of the magnet holder used in the waveguide type optical isolator 1. As shown in the figure, the cross-sectional shape of the magnet holder 7' may be comb shape. Namely, it may be a structure which the second protruded portion 72 is constituted by further two protruded portions 721 and 722 and it has spaces formed by the base portion 70 and the two protruded portions 721 and 722. In this case, the first housing portion 7A is formed with the base portion 70, the first protruded portion 71, and the protruded portion 721 of the second protruded portion 72, further, the second housing portion 7B is formed with the base portion 70, the protruded portion 722 of the second protruded portion 72, and the third protruded portion 73.

Incidentally, the magnet holder 7 may have five or more protruded portions, in other words, the second protruded portion may have three or more protruded portions. Namely, the structure of the second protruded portion 72 is not limited in particular, so long as the magnet holder 7 has a structure which can form the first housing portion 7A and the second housing portion 7B, and can fix the mounted distance between the first magnet 5A and the second magnet 5B.

Further, though it does not show in the figure, the first protruded portion 71 and the third protruded portion 73 also may have a plurality of protruded portions as in the case of the second protruded portion.

Figure 8:
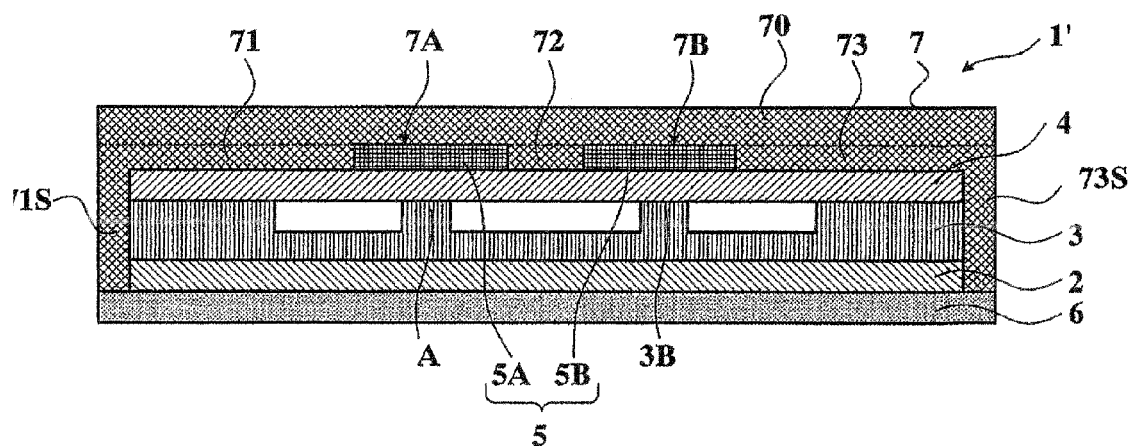
FIG. 8 is a schematic cross-sectional view of a waveguide type optical isolator according to an alternative example of the present invention.

FIG. 8 shows a schematic cross-sectional view of a waveguide type optical isolator according to an alternative example of the present invention. Incidentally, in waveguide type optical isolator according to the present embodiment, since the other structure except for the structure of the magnet holder are substantially the same as the aforementioned waveguide type optical isolator, in what follows, the same symbol is given to the same component, and the detailed description thereof will be omitted.

In other words, as shown in the figure, the waveguide type optical isolator 1' comprises the substrate 2, the waveguiding layer 3, the magnetic garnet 4, and the magnetic field applying means 5, and they are set on the package substrate 6. And the two waveguides 3A and 3B is formed in the waveguiding layer 3. Furthermore, the magnets 5A and 5B constituting the magnetic field applying means 5 are housed and fixed within the magnet holder 7, and are set on the magnetic garnet 4.

As shown in the figure, in the magnet holder 7 used in the waveguide type optical isolator 1', the side portion 71S of the first protruded portion 71 and the side portion 73S of the third protruded portion 73 extend up to the upper surface of the package substrate 6. Therefore, the side portion 71S of the first protruded portion 71 and the side portion 73S of the third protruded portion 73 are bonded and fixed to the upper surface of the package substrate 6 by adhesive or the like. Incidentally, resin adhesive of epoxy resin, silicone resin, or the like may be used as the adhesive, as in the case of the adhesive coated on the magnetic garnet 4.

Therefore, since it is possible to house and fix the substrate 2, the waveguiding layer 3 (the waveguides 3A and 3B), the magnetic garnet 4, and the magnetic field applying means 5 within the magnet holder 7, thereby it is possible to fix the magnets 5A and 5B over a long period of time, in addition, to guarantee the long-term reliability of the waveguide type optical isolator 1'.

Namely, the heights of the side portion 71S of the first protruded portion 71 and the side portion 73S of the third protruded portion 73 are the same height as the total height of the substrate 2, the waveguiding layer 3 (the waveguides 3A and 3B), the magnetic garnet 4, and the magnetic field applying means 5.

Incidentally, the height of the second protruded portion 72 is 0.3 mm which is the same height as the height (H) of the magnets 5A and 5B. However, also in the waveguide type optical isolator 1', any one of the protruded portions 71 to 73 have only to be bounded with the magnetic garnet 4, or either the side portion 71S of the first protruded portion 71 or the side portion 73S of the third protruded portion 73 has only to bond with the package substrate 6. Therefore, the height of the second protruded portion 72 may be lower than the height (H) of the magnets 5A and 5B.

Incidentally, as in the case of the aforementioned waveguide type optical isolator 1, the width of the magnet holder 7 can be set arbitrarily by adjusting the width (thickness) of the first protruded portion 71 and the third protruded portion 73. However, the length from the inner wall of the first protruded portion 71 to the inner wall of the third protruded portion 73 is 0.5 mm.

Figure 9:
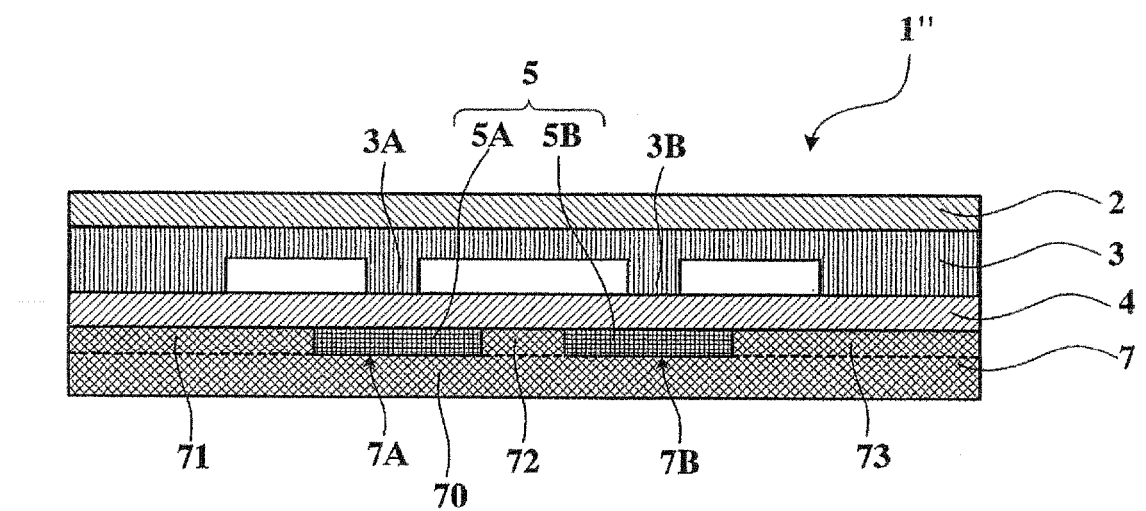
FIG. 9 is a schematic cross-sectional view of a waveguide type optical isolator according to other alternative example of the present invention.

FIG. 9 shows a schematic cross-sectional view of a waveguide type optical isolator according to a further alternative example of the present invention. Incidentally, in waveguide type optical isolator according to the present embodiment, since the other structure except for the structure sharing the magnet holder with the package substrate are substantially the same as the aforementioned waveguide type optical isolator 1 and 1', in what follows, the same symbol is given to the same component, and the detailed description thereof will be omitted.

As shown in the figure, the waveguide type optical isolator 1" according to the present embodiment is constituted by providing the magnetic garnet 4 on the upper surface of the magnet holder 7 with the base portion 70 of the magnet holder 7 is made underside, providing the waveguiding layer 3 (the waveguides 3A and 3B) on the upper surface of the magnetic garnet 4, and providing the substrate 2 on the upper surface of the waveguiding layer 3. Namely, as shown in the figure, the waveguide type optical isolator 1" is not provided with the package substrate, and the magnet holder 7 also perform the role as the package substrate.

Therefore, it is possible to improve the population accuracy of the magnets 5A and 5B, and to fix the magnets 5A and 5B over a long period of time, in addition, to eliminate the package substrate, thereby it is possible to be further downsized the waveguide type optical isolator 1" and to reduce manufacturing costs.

The magnet holder 7 used in the waveguide type optical isolator 1" also constitute with the base portion 70 and the three protruded portions 71 to 73. And the first housing portion 7A is formed with the base portion 70, the first protruded portion 71, and the second protruded portion 72, further, the second housing portion 7B is formed with the base portion 70, the second protruded portion 72, and the third protruded portion 73. Furthermore, the first magnet 5A is housed and fixed within the first housing portion 71, and the second magnet 5B is housed and fixed within the second housing portion 72.

In the magnet holder 7 used in the waveguide type optical isolator 1", the pointed end surfaces of the protruded portions 71 to 73 and the magnets 5A and 5B are bonded and fixed by the adhesive coated on the lower surface of the magnetic garnet 4. Incidentally, resin adhesive of epoxy resin, silicone resin, or the like may be used as the adhesive, as in the case of the adhesive coated on the magnetic garnet.

The heights of the protruded portions 71 to 73 are 0.3 mm which are the same height as the height (H) of the magnets 5A and 5B. However, also in the waveguide type optical isolator 1", any one of the protruded portions 71 to 73 has only to be bonded with the magnetic garnet 4. Therefore, at least one of the protruded portions 71 to 73 is the same height as the height (H) of the magnets 5A and 5B.

Furthermore, by increasing the height of the side portions of the first protruded portion 71 and the third protruded portion 73, the waveguide type optical isolator 1" may be constituted so that the magnetic field applying means 5, the magnetic garnet 4, the waveguiding layer 3 (the waveguides 3A and 3B), and the substrate 2 are housed and fixed within the magnet holder 7. Thereby, it is possible to fix the magnets 5A and 5B over a long period of time, additionally, to guarantee the long-term reliability of the waveguide type optical isolator 1".

As described above, it is described about the preferred embodiments of the present invention. However, the present invention is not limited the aforementioned specific embodiments, and various modifications and changes may be made within the scope of the summary of the present invention described in the claims.

The invention claimed is:

1. A waveguide type optical isolator comprising:
   a substrate;
   a waveguiding layer;
   a magnetic garnet;
   a magnetic field applying means; and
   a package substrate;
   wherein:
   a waveguide is formed in the waveguiding layer;
   the magnetic field applying means includes a first magnet and a second magnet;
   the first magnet and the second magnet are housed and fixed within a magnet holder;
   the magnet holder comprises a base portion and at least three protruded portions, including a first protruded portion that extends from the base portion, a second protruded portion that extends from the base portion, and a third protruded portion that extends from the base portion;
   a first housing portion is formed with the base portion, the first protruded portion, and the second protruded portion;
   a second housing portion is formed with the base portion, the second protruded portion, and the third protruded portion;
   the first magnet is housed and fixed within the first housing portion; and
   the second magnet is housed and fixed within the second housing portion.

2. The waveguide type optical isolator according to claim 1, wherein a width of the second protruded portion is equal to a mounted distance between the first magnet and the second magnet on the magnetic garnet.

3. The waveguide type optical isolator according to claim 1, wherein the base portion of the magnet holder is provided at an upper side of the magnet holder, and the magnet holder is provided on the magnetic garnet.

4. The waveguide type optical isolator according to claim 1, wherein:
   the first protruded portion and the third protruded portion extend to an upper surface of the package substrate; and
   the substrate, the waveguiding layer, the magnetic garnet, and the magnetic field applying means are housed within the magnet holder.

5. The waveguide type optical isolator according to claim 1, wherein:
   the base portion of the magnet holder is provided at a lower side of the magnet holder;
   the magnetic garnet, the waveguiding layer, and the substrate are provided on an upper surface of the magnet holder in this order; and
   the magnet holder is used as the package substrate.

6. A waveguide type optical isolator comprising:
   a substrate;
   a waveguiding layer;
   a magnetic garnet;
   a magnetic field applying means; and
   a package substrate;
   wherein:
   a waveguide is formed in the waveguiding layer;
   the magnetic field applying means includes a first magnet and a second magnet;
   the first magnet and the second magnet are housed and fixed within a magnet holder;
   the magnet holder is provided on the magnetic garnet;
   the magnet holder comprises a base portion and at least three protruded portions, including a first protruded portion that extends from the base portion, a second protruded portion that extends from the base portion, and a third protruded portion that extends from the base portion;

a first housing portion is formed with the base portion, the first protruded portion, and the second protruded portion;

a second housing portion is formed with the base portion, the second protruded portion, and the third protruded portion;

the first magnet is housed and fixed within the first housing portion; and the second magnet is housed and fixed within the second housing portion.

7. The waveguide type optical isolator according to claim 6, wherein:

the first protruded portion and the third protruded portion extend to an upper surface of the package substrate; and the substrate, the waveguiding layer, the magnetic garnet, and the magnetic field applying means are housed within the magnet holder.

8. The waveguide type optical isolator according to claim 6, wherein:

the base portion of the magnet holder is provided at a lower side of the magnet holder;

the magnetic garnet, the waveguiding layer, and the substrate are provided on an upper surface of the magnet holder in this order; and the magnet holder is used as the package substrate.

* * * * *